United States Patent
Mehrvar et al.

(10) Patent No.: US 7,403,473 B1
(45) Date of Patent: Jul. 22, 2008

(54) METHOD AND APPARATUS FOR ACCELERATED PROTECTION SWITCHING IN A MULTI-SWITCH NETWORK ELEMENT

(75) Inventors: Hamid Mehrvar, Wrentham (CA); Kim Roberts, Nepean (CA); Paul Warren, Nepean (CA)

(73) Assignee: Nortel Networks Limited (CA)

( * ) Notice: Subject to any disclaimer, the term of this patent is extended or adjusted under 35 U.S.C. 154(b) by 772 days.

(21) Appl. No.: 10/760,748

(22) Filed: Jan. 20, 2004

Related U.S. Application Data (60) Provisional application No. 60/532,960, filed on Dec. 29, 2003.

(51) Int. Cl.
*H04L 1/00* (2006.01)

(52) U.S. Cl. .................. 370/217; 370/388

(58) Field of Classification Search ............ None
See application file for complete search history.

(56) References Cited

U.S. PATENT DOCUMENTS

| | | | | |
|---|---|---|---|---|
| 5,436,886 A | * | 7/1995 | McGill | 370/219 |
| 6,049,542 A | * | 4/2000 | Prasad | 370/386 |
| 6,653,929 B1 | * | 11/2003 | Hu et al. | 340/2.1 |
| 7,023,842 B2 | * | 4/2006 | Carson et al. | 370/388 |
| 7,106,729 B1 | * | 9/2006 | Gullicksen et al. | 370/388 |
| 7,158,478 B1 | * | 1/2007 | Mazzurco et al. | 370/222 |
| 7,161,898 B1 | * | 1/2007 | Mazzurco et al. | 370/217 |
| 2003/0117949 A1 | * | 6/2003 | Moller et al. | 370/219 |
| 2003/0200330 A1 | * | 10/2003 | Oelke et al. | 709/238 |
| 2004/0218525 A1 | * | 11/2004 | Elie-Dit-Cosaque et al. | 370/223 |

* cited by examiner

*Primary Examiner*—Brian D Nguyen
(74) *Attorney, Agent, or Firm*—Anderson Gorecki & Manaras (57) ABSTRACT

Accelerated protection switching in a multi-platform network switch may be achieved by allocating connectivity slots from the port cards to the switch cards for all states of a connection through the switch and forming maps of the allocations for use by the port cards and switch cards. By allocating connectivity slots to all states of the connection, the connection will not be blocked in connection with a state change. By storing the slot allocation in maps a connection state change may be implemented by the switch by causing traffic on the connection to be transported using the allocated slots. Various protection modes can use the same connectivity slots with collision avoidance via prepared maps Thus, having predefined paths via allocated slots provisioned through the network element enables the network element to switch very quickly from working to protection to comply with applicable standards and minimize disruption of network traffic.

10 Claims, 4 Drawing Sheets

METHOD AND APPARATUS FOR ACCELERATED PROTECTION SWITCHING IN A MULTI-SWITCH NETWORK ELEMENT

BACKGROUND

1. Field

This application relates to communication networks and, more particularly, to a method and apparatus for accelerated protection switching in a multi-switch network element.

2. Description of the Related Art

Data communication networks may include various computers, servers, hubs, switches, nodes, routers, proxies, and other devices coupled to and configured to pass data to one another. These devices will be referred to herein as "network elements" or "nodes". Data is communicated through the data communication network by passing protocol data units, such as frames, packets, cells, or segments, between the network elements by utilizing one or more communication links. A particular protocol data unit may be handled by multiple network elements and cross multiple communication links as it travels between its source and its destination over the network.

Communication networks may be configured in multiple different topologies, such as ring-based topologies and mesh topologies. Ring-based topologies advantageously provide fast protection switching such that if a failure is experienced on a portion of the ring, traffic may be diverted the other way through the ring to minimize disruption on the network. One common ring-based topology has been successfully deployed in North America and several other areas of the World is commonly referred to as BLSR which runs on Synchronous Optical NETwork (SONET) equipment. Another similar standard that is used extensively in Europe and several other areas is commonly referred to as MS-SPRing which runs on Synchronous Data Hierarchy (SDH) equipment. SONET/SDH divides the total capacity on a link up into time slots, referred to in the standards as Synchronous Telecommunication Signals (STS#s). Although one or more embodiments of the invention may be described herein in connection with a SONET/SDH network implementation, the invention is not limited in this manner and may be more broadly utilized in a network element operating in a network configured in other than ring-based or mesh-based networks, and not limited to the SONET/SDH physical (layer 1) protocol.

Mesh topologies enable nodes on the mesh to communicate with multiple other nodes so that traffic is not required to be communicated to a specific node as it progresses through the network. To increase the speed at which traffic may be protection switched through a mesh network without requiring a new path to be found through the mesh network, it is possible to organize protection cycles (p-cycles) and reserve a portion of the bandwidth on those p-cycles to carry protection traffic in the event of a failure.

P-cycles enable portions of a mesh network to be designated to back up particular links in the mesh to enable the network devices to perform fast link restoration without requiring notification of the source or destination nodes. Thus, in a mesh network the working path will be carried over the mesh network, while the restoration path will be carried over the logical ring. Restoration of traffic from a failed arc, however, should not have an unplanned negative impact on traffic which normally uses the restoration path. Mesh networks may be based on the SONET physical layer or other physical layer protocol.

As used herein, the term "restoration" will be used to convey the notion of restoring a connection once there has been a failure. Thus, for example, if a connection is provisioned through the network and there is a problem on the network, the connection may be restored on the network by finding a new path. Restoration within a network element is similar—if the connection through the network element is required to change, the connection through the network element is restored by finding a new path through the network element for the connection after the failure has occurred.

One restoration approach is to use a re-dial approach. Once it is required to switch from the original path, the re-dial approach calculates a new path on the fly. If this calculation is fast enough, the approach can be used in place of protection; otherwise, it can only be used for restoration.

Protection, by contrast, refers to the notion of having a back-up path should there be a problem in the path carrying the connection. On a network level, a protection path is a path that is reserved or specified as being configured to carry the connection should there be a problem on the working path. Furthermore, although a signaling protocol may be used to trigger the protection operation, no new connection commands have to be sent to any node to achieve this. Protection carries a similar meaning at the network element level—a backup path for the connection is already preconfigured through the network element to carry the traffic in event the primary cannot be used because of a an internal or external failure. Similarly in this case, no new internal connection commands have to be centrally calculated and/or distributed.

Protection may be dedicated or shared. Dedicated protection refers to resources that are reserved solely to protect the connection or group of connections associated with the dedicated protection. Shared protection refers to having greater working traffic than protection capacity on the protected network.

As networks have evolved to handle increasing amounts of data, the complexity of network elements configured to operate on the communication networks has increased as well. Large conventional network elements configured as network switches include multiple port cards and one or two switches or switch cards configured to switch signals to/from the port cards. One way to increase the capacity of a network element is to use multiple working switches or switch cards, with minimal or no switch to switch connectivity, within the network switch, and optionally include one or more back-up switches or switch cards to be used in the event of a failure of a primary switch card.

Using multiple switches or switch cards requires routing to take place to cause the connections being handled by the network element to be allocated to one or many of the switches or switch cards. In doing so, the routing algorithm should minimize or ideally eliminate the possibility that one or more of the input signals will not be able to be transmitted/handled by the network element during normal operation or when the signals are switched to the protection path through the network element. An inability to switch to protection from working or between arbitrary STS#s will be referred to herein as blocking. Additionally, depending on the protocols in use on the network, additional constraints may be imposed. For example, in a SONET network, the four-fiber ring standard (GR1230) provides that a failure on a ring should be detected in less than 10 msec and that the time to switch traffic to protection should be accomplished in under 50 msec. Additionally, ideally, a network element should be able to process ring-to-ring connection set-up requests at an acceptable rate. To accommodate these requirements, the routing algorithm should be able to be implemented and operated in a relatively quick and hence simple manner. Moreover, once a connection is implemented on the network switch, the switch should not cause the connection to be blocked if traffic is required to switch e.g., from working to protection on a ring.

Accordingly, it would be desirable to have a way to route and switch at an arbitrary granularity, for example at an STS-1 level, and to enable accelerated protection switching in a network switch.

SUMMARY OF THE DISCLOSURE

As described in greater detail below, accelerated protection switching in a multi-switch network element may be accomplished by allocating connectivity slots to connections through the network element when the connections are first provisioned through the network element. By allocating connectivity slots to both the working and protection modes of the connections, the switch is able to assure that the connections will not be blocked if the state of a connection changes from working to protection. Various protection modes may share the slots for non-overlapping protection modes.

Once the connectivity slots are allocated to the connections, the allocations are recorded in one or more maps for use by the components of the network element when handling traffic through the network element. Each map may represent one protection mode. For example, in a ring network during normal operation, working traffic is transmitted between components of the network element using the slots allocated to working traffic. In the event of a failure on the network that requires the state of the connection to change to span protect or ring protect, slots allocated to the protect state with appropriate maps are used to carry traffic on the same connection within the network element. Extra traffic on the protection path is handled in the same way. Having predefined paths via allocated connectivity slots provisioned through the network element enables the network element to minimize or eliminate the possibility of blocking at the node while allowing the network element to switch very quickly from working to protection to comply with applicable standards and minimize disruption of traffic on the network.

BRIEF DESCRIPTION OF THE DRAWINGS

Aspects of the present invention are pointed out with particularity in the claims. The following drawings disclose one or more embodiments for purposes of illustration only and are not intended to limit the scope of the invention. In the following drawings, like references indicate similar elements. For purposes of clarity, not every element may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

As described in greater detail below, accelerated protection switching in a multi-switch network element may be accomplished by allocating connectivity slots to connections when the connections are first provisioned through the network element. By allocating connectivity slots to both the working and protection modes of the connections, the switch is able to assure that the connections will not be blocked if the state of a connection changes from working to protection. Once the connectivity slots are allocated to the connections, the allocations are recorded in one or more maps for use by the components of the network element when handling traffic through the network element. During normal operation, working traffic is transmitted between components of the network element using the slots allocated to working traffic. In the event of a failure on the network that requires the state of the connection to change to span protect or ring protect, the allocated protection slots with a map that correspond to the new state are used to carry traffic on the connection. Extra traffic on the protection path is handled in the same way. Having predefined paths via allocated connectivity slots provisioned through the network element enables the network element to minimize or eliminate the possibility of blocking at the node while allowing the network element to switch very quickly from working to protection to comply with applicable standards and minimize disruption of traffic on the network.

The following discussion will focus on an embodiment of the invention in which a network element has been configured to operate in a SONET/SDH ring network. The invention is not limited to this embodiment as the network element may also be deployed in other types of networks, e.g., mesh networks. Accordingly, the following description is not intended to limit the applicability of the invention but rather to explain operation of an implementation of the invention in an understandable environment.

Figure 1:
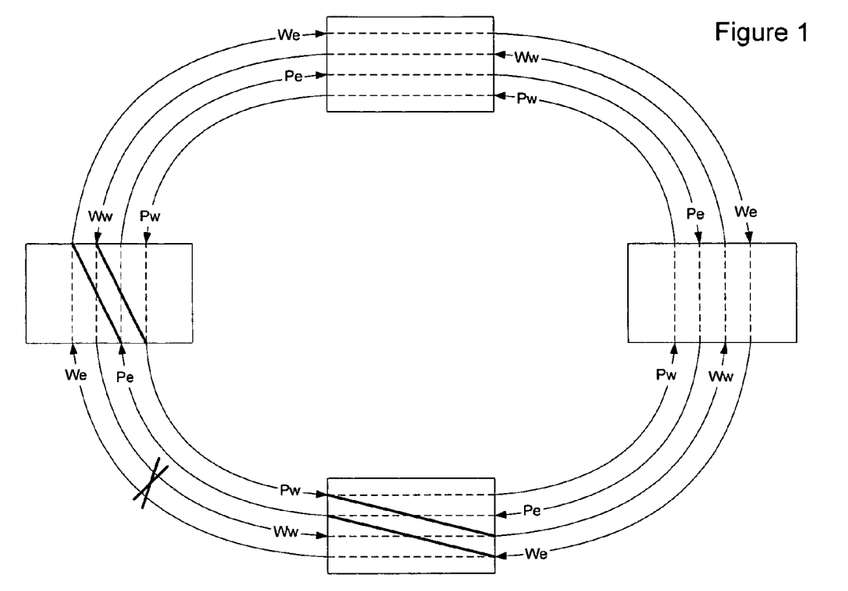
FIG. 1 is a functional block diagram of an ring in a network illustrating span switching and bridging due to a failure on the ring.

FIG. 1 illustrates one example of a four fiber ring network. In this example it will be assumed that SONET/SDH is being used as the underlying physical layer transport mechanism, although the invention is not limited in this manner. As shown in FIG. 1, a four fiber ring network generally includes a working east path (We) and a working west path (Ww). To enable traffic on the working paths to be protected in the event of a failure, the ring also includes a protection east path (Pe) and a protection west path (Pw). Network elements form nodes between spans on the ring-topology network. Traffic may generally enter the ring at any node and exit the ring at any node. Typically, the ring is part of a larger network having multiple interlocking rings. In the following description, the following notations will also be used to represent the fiber transmit/receive pairs to/from the ring: $W_X = W_E$ or $W_W$; $P_X = P_E$ or $P_W$; $W_Y = W_W$ or $W_E$; and $P_Y = P_W$ or $P_E$. Additionally, for a given pair (e.g. $W_E$) the transmit port will be identified as $W_{E\_}Tx$ and the receive port will be identified as $W_{E\_}Rx$.

Figure 2:
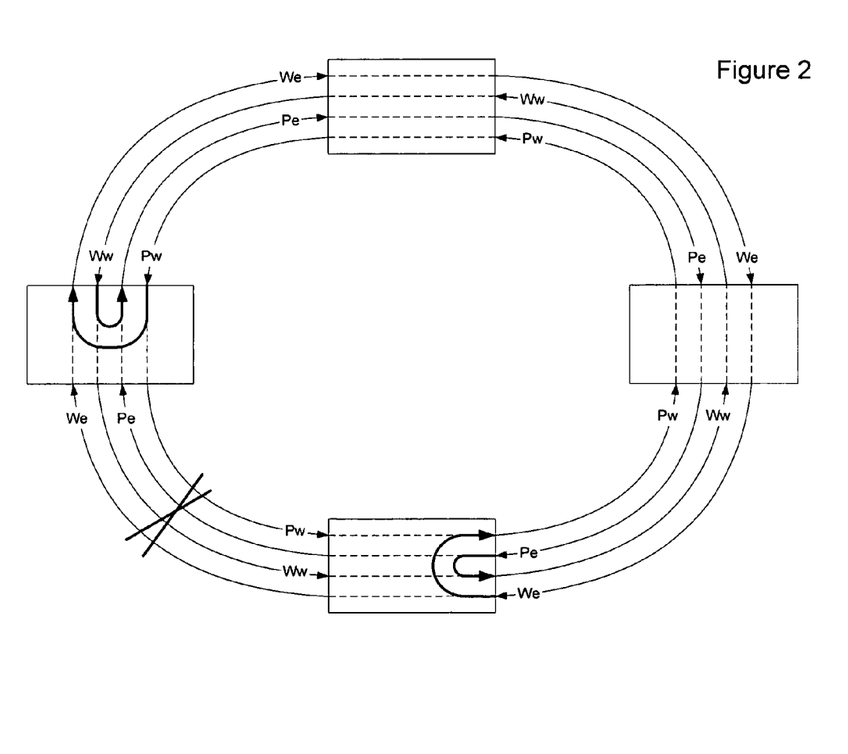
FIG. 2 is a functional block diagram of an ring in a network illustrating ring switching and bridging due to a failure on the ring

FIG. 1 illustrates a span failure on the ring. For simplicity no Add or Drop traffic has been shown. As illustrated, upon occurrence of a span failure, working pass-through traffic from the working west path will be transmitted to protection east. This is known as a SPAN BRIDGE. Traffic previously received from working east will be instead selected from protection east—this is known as a SPAN SWITCH FIG. 2 illustrates a complete link failure on the ring. In such a link failure both the working and protection paths are affected. Thus, protection of the traffic in this event has to be achieved using a RING BRIDGE and a RING SWITCH. Failure of a node on the ring (not illustrated) would also cause a similar ring bridge and switch. In the event of a ring switch, $W_{w\_}Rx$ is bridged to $P_{w\_}Tx$ and $W_{w\_}Tx$ switched to receive from $P_{w\_}Rx$.

Figure 3:
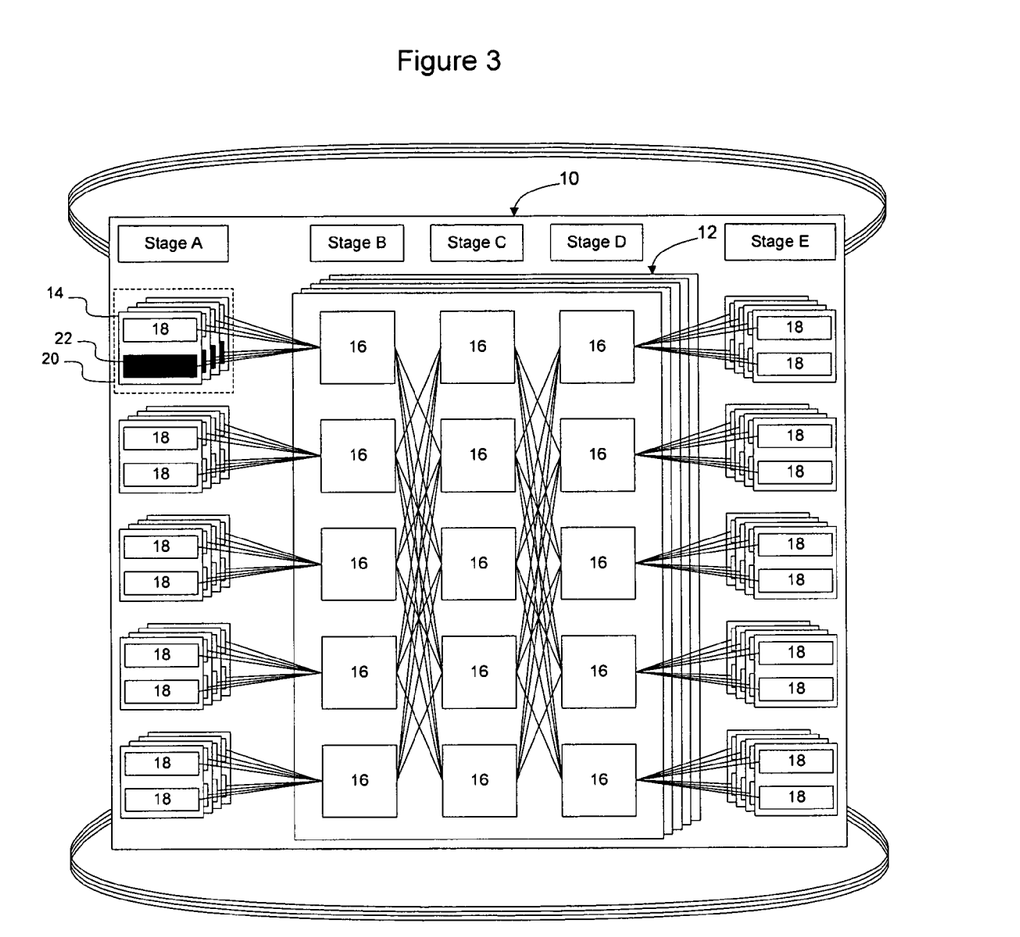
FIG. 3 is a functional block diagram of a network element configured to implement an embodiment of the invention.

FIG. 3 illustrates an architecture of a network element configured to operate as a node in a SONET ring or a mesh network. In the embodiment of FIG. 3, the network element 10 includes five switches 12 and twenty port cards 14. The switches may be switch cards or other logical switches such as segments of switch cards, switch shelves, or other types of switches. In the embodiment discussed below in connection with FIG. 3 the switches will be described as switch cards. The invention is not limited to this embodiment.

As used herein, the term "switch" within a network element will be used to refer to an element that connects via high bandwidth channels to port cards but isn't configured to connect to other switches via high bandwidth channels. Thus, data paths through the network element will typically pass through one of the switches but generally will not pass through two or more switches within the network element. For example a single unit of data, e.g., STS-1, will pass through one switch but not a cascade of multiple switches. However, the term switch as used herein does not exclude the possibility of including control paths between the switches to enable administrative and control information to be exchanged between the switches. Similarly, limited exchanges of data may take place as well, for example to route around a failed port card, without departing from the definition used herein. The switches are not, however, fully cross-connected between each other in a Clos manner. Additionally, internally a switch as used herein is configured to control more than two directions. For example, the term "switch" as used herein is not simply a two direction switch but enables a higher degree of interconnectivity, e.g., 3 inputs to 3 outputs or greater. It is anticipated that the switches may interconnect hundreds or more inputs to hundreds or more outputs, although the invention is not limited in this manner.

The switches may be switches on a single shelf, may be switches on different shelves in the same network element, may be switches in different boxes forming a part of a logical network element, or may be switches in different network elements forming part of a virtual switching group treated as a single entity from a network management or other hierarchical standpoint. The invention is thus not limited to any particular implementation.

The port cards connect to the optical fibers forming the communication links in the communication network. To achieve availability of %99.9999 at node level and %99.999 at the network level, one of the 5 switches 12 in this embodiment is used to protect 4 working switch cards. Thus, upon a failure of one of the working switch cards, the spare switch card may be used until the failed working switch card can be replaced. While the network element illustrated in FIG. 3 will be used to illustrate an embodiment of the invention, the invention is not limited to this embodiment. For example, the invention may be implemented in embodiments having different numbers of port cards, switch cards, stages, or which are organized in a different manner. All such embodiments are intended to be incorporated herein and the claims are not limited to the particular example illustrated in FIG. 3.

In the embodiment shown in FIG. 3, the system model in this embodiment is a 5-stage Clos-style switch in which stage A and stage E are receive (RX) and transmit (TX) stages and are supported by port cards 14, and stages B, C and D are formed on the switch cards 12. As used herein, the term "RX side" will be used to describe the links between stages A and B, and the term "TX side" of the switch will refer to the links between stages D and E. In the embodiment illustrated in FIG. 3, stages A and E are the Rx and Tx stages of bi-directional interfaces and as such would often be implemented on a single physical port card.

In the embodiment shown in FIG. 3, each switch card is implemented as a switch card having 15 switching elements 16 arranged in a 3-stage fully-connected Clos switch, which is a standard configuration for large scale switches. The switching elements may be formed using Application Specific Integrated Circuits (ASICs), Field Programmable Gate Arrays (FPGAs), or any other conventional processing units. In the embodiment illustrated in FIG. 3, each switching element 16 has 64 input ports and 64 output ports, each of capacity 2.5,Gbps (48 STS-1s), to give a total throughput of 160 Gbps per chip with complete any-to-any time/space interchange capability. It will be assumed herein that the switch cards are internally non-blocking. The invention is not limited to this embodiment as other configurations may be utilized as well.

Port cards interface with communication links and forward the traffic on these links to the several switch cards. In the embodiment illustrated in FIG. 3, each port card 14 includes several port processors 18, such as ASICs or FPGAs, each of which is configured to handle one or more interfaces (not shown). In one implementation, the port processors are configured to handle 10 Gigabit/sec interfaces, although the invention is not limited to the type of interface implemented on the port cards 14. The port cards may have any number of interfaces and port processors 18 facing each direction. For example, each port card may have two or four port processors configured to handle interfaces in the receive and transmit direction. The invention is not limited to any particular number of port processors, interfaces, or any particular configuration of port processors and interfaces on the port cards 14.

There are many ways of logically arranging the interfaces to achieve enhanced resiliency against port card failure. In one embodiment, illustrated in FIG. 3, the several interfaces associated with a given connection through the network ($W_W$, $W_E$, $P_E$, $P_W$ for a four fiber ring) are each interfaced to the network element via a separate port card. The port cards, in this embodiment, are also arranged into five segments 20 of four port cards each, each segment having two switching groups 22. One of the switching groups in a first segment is illustrated as the blackened-out processors 18 in FIG. 3. A switching group, in this context, contains four port processors, one from each of the four port cards in the segment, chosen such that any ring will be in no more than one switching group. Each switching group has the same connectivity to all switch cards so that traffic from each switching group may go to any switch card. However, for convenience, in the illustrated embodiment the connectivity between stages A and B is configured such that switching groups 1 and 2 are connected to the first switching element of stage B on each switch card, switching groups 3 and 4 are connected to the second switching element of stage B on each switch card, and so on. Similarly, the connectivity between stages D and E is configured such that each switching element in stage D is connected to two switching groups in stage E. The invention is not limited to this embodiment as other design configurations choices may be made as well.

It is desirable to achieve ring-to-ring connectivity while enabling a ring state change to be accommodated without blocking. In the embodiment described herein in connection with FIG. 3, it will be assumed that the ring is only in one state at a given time, e.g. working, pass through, span protect, or ring protect. This simplifies the architecture of the switch. By choosing to terminate all connections of the same circuit ($W_W$, $P_W$, $W_E$, $P_E$) on the same stage B switching element, ring/span switching for a given upstream protection action may be handled on the same switching element of stage B. This allows all modes of ingress span/ring switching to be accommodated whilst requiring no change to stage A AND no additional bandwidth between stage A and stage B.

In the embodiment illustrated in FIG. 3, the switch cards are configured such that there are two separate paths within each switch card to allow different types of traffic to be separated. In this embodiment, one path used for passthru mode and extra traffic and the other path is used for other traffic. Specifically, in this embodiment the switch cards have been configured such that span/ring switching occurs on stage B while span/ring bridging happens at stage D. Accordingly, since working and protection traffic are handled together and bridged at stage D, that traffic has been grouped to share the same path within the switch card. The invention is not limited to this embodiment as other configurations may be possible as well.

If the ring is only in one protection state at any given time, the switching elements in stage D feed $P_X\_tx$ with the time-slots of traffic associated with that state. That is to say, the stage D to E STS-1 carrying a particular pass through (or extra traffic) STS-1 in normal operation will carry a different STS-1's protection traffic in case of downstream ring/span bridge protect. Thus, although the data going to $P_X\_tx$ may come from up to three different places depending upon the protection state—pass through, ring-protect, and span-protect, the resources to $P_X\_tx$ can be shared. The three-way sharing does not conflict since the resources are given to the STS-1's of the same ring with a new state via prepared maps which are discussed in greater detail below.

For a given ring, for a given STS-1, the switch card stage D egress switching element transmitting $W_X\_tx$ will also originate $P_{E_{13}}\_tx$ and $P_W\_tx$. This allows all modes of egress span/ring/pass through switching to route around a fault. Additionally, slots allocated to $P_E\_tx$ and $P_W\_Tx$ may be used for extra traffic for any STS-1 on the same ring—these slots won't be required until a protection event causes the extra traffic to be dropped.

According to an embodiment of the invention, as discussed in greater detail below, traffic is sliced across the switch cards and ring-state-dependent switching maps are used to map traffic from the port cards to the switch cards. This enables the switch to handle two or four-fiber-ring protection schemes or other protection schemes, such as a p-cycle protection scheme in a mesh network.

With this system under consideration, it will be assumed that the granularity of the rings is STS-48. Larger rings will be assumed to be multiples of STS-48 (N*STS-48). The invention is not limited to this granularity, however, as other granularities may be chosen as well.

The example in FIG. 3, assumes port cards with 2 processors 18 each having 100 Gbps connectivity to the switch cards. Each processor assumes 20G connectivity to each switch card, i.e., 80G to all 4 working switch cards (there is also 20G to the protection switch card but this is ignored for clarity here). A switching group 22 thus has a total capacity of 320G to all switch cards, i.e., 80G for We, 80G for Ww, 80G for Pe and 80G for Pw. With ring granularity of STS-48, each switching group can thus handle a maximum of 32 4-fiber rings. However, according to one embodiment of the invention, a portion of the bandwidth is reserved to be used as dilation (spare slots) so that the effective number of rings supported is less than the maximum number of rings supported by a given switching group. In the embodiment discussed below it will be assumed that 30 rings are supported per switching group. A maximum of 32 is possible in this example but the invention is not limited to the numbers used in this example.

Figure 4:
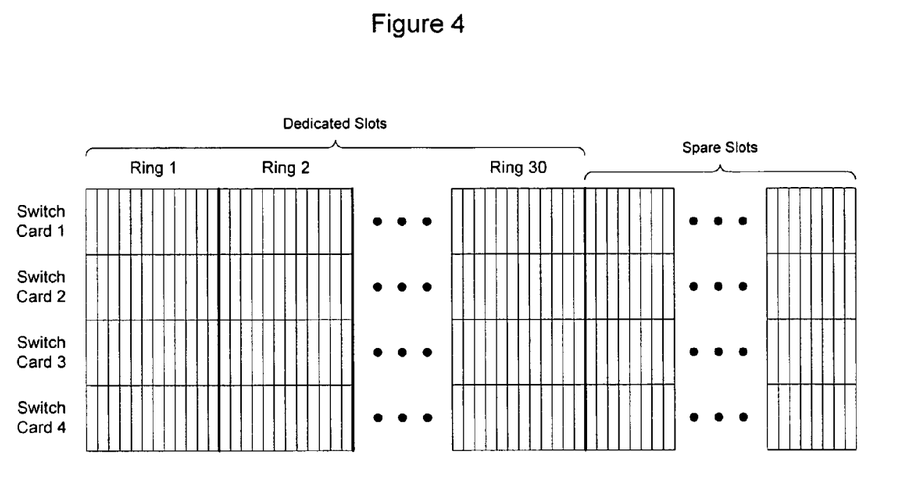
FIG. 4 is a functional block diagram illustrating slot allocations in the embodiment of FIG. 3 according to an embodiment of the invention.

FIG. 4 illustrates one embodiment of the invention in which connectivity between a switching group and the switch cards has been divided into slots and in which the slots have been divided evenly between the switch cards. By dividing the time slots between the switch cards the load on the port cards may be distributed between the switch cards. Additionally, this allows each switch card to handle some portion of the traffic on any given ring.

In this embodiment, slots are pre-allocated for each STS-48 ring, and sliced evenly among the switch cards. For example, in the embodiment illustrated in FIG. 3 with four working switch cards, each ring has twelve (48/4=12) pre-defined time-slots to each one of the switch cards. However, time-slots are not tied to particular STS-1 numbers. Rather, each time-slot can carry any arbitrary STS-1 number.

Another routing algorithm that may be used in a network element having multiple active switch cards is the modulo-n approach, in which high bandwidth connections are sliced statically among the n working switch cards on the switch. For example, in a switch having four working switch cards, the STS-1#1 of each connection would be connected through switch card number 1, the STS-1#2 would be connected through switch card number 2, ... STS-1#4 would be connected through switch card number 4, STS-1 #5 through card switch 1 etc. In this manner, the 48 STS-1s in a standard SONET/SDH connection would be split evenly between the 4 switch cards in the switch. One advantage to this approach is that it eliminates the possibility of blocking within a node. Modulo-n approach works very well for connections of STS-n granularity or its multiples.

FIG. 4 illustrates the distribution of time-slots from each processor of a given switching group to the rings being handled by that group. The pre-allocated time slots will be referred to herein as "dedicated slots." Slicing of dedicated slots across the switch cards occurs in both the RX and TX sides to reduce blocking in four-fiber ring switching.

The remaining time slots in both TX and RX links are called spare or "dilation" slots. Since there are 30 rings per switching group, the slot capacity of the other two rings are used as spare capacity. From each processor 18 there are a total of 1536 time-slots (each with STS-1 bandwidth) to the entire four switch cards. Since each ring takes 12 pre-defined time-slots (12×STS-1 on each of its fibers) to each switch card, the remaining 24 'spare' time-slots (from each processor of switching group) to each switch card can be shared among all 30 rings, as necessary. As discussed in greater detail below, these spare slots are used when connecting from a dedicated slot on the Rx side to a dedicated slot on the Tx side is not possible.

According to an embodiment of the invention, when the switch is first configured, or when additional connections are to be made on the network element, a controller on the network element allocates slots on the transmit and receive sides of the network element to set up the connections through the network element. These slot allocations are collected and used to form one or more maps for the switching elements on the switch cards and port processors on the port cards to allow the connections to be transmitted in appropriate slot(s). The map(s) includes slot allocations for both the working and protection traffic on the ring so that, upon an occurrence of a fault on the network, the network element may affect a fast transfer from working to protection. Additionally, since the working and protection slots are allocated when the connection is first established, the switch is non-blocking in operation. Specifically, the slots are allocated to the traffic and not re-allocated to other connections. Therefore, each connection has a dedicated path for working and for protection traffic through the network element. The process of establishing the maps will be discussed in greater detail below.

Initially, when the network element is first started and connections are to be added, a controller on the network element will allocate an appropriate number of slots to the connection. This is done, as discussed briefly above, by first trying to allocate dedicated slots to that connection. Since the dilation slots are to accommodate situations where dedicated slots on both TX and RX sides are not available and are to be shared between the several connections passing through the network element, in this embodiment, the dedicated slots are allocated first and the dilation slots are reserved for situations where a connection cannot be made using dedicated slots. Specifically, the controller will first try to allocate dedicated slots on the transmit and receive sides of the network element to the connection.

Additionally, according to one embodiment of the invention, the allocation of dedicated slots attempted in such a way that the traffic of each ring is sliced among all the working switch cards. The invention is not limited to this embodiment, however.

If there are not sufficient dedicated slots on both the receive and transmit sides of the network element, the controller will then try to use dedicated slots on one of the transmit and receive sides for the connection, and allocate dilation slots on the other side. For example, in one embodiment the network element may try to allocate spare slots on the receive side and dedicated slots on the transmit side to the connection. In another embodiment the network element may try to allocate spare slots on the transmit side and dedicated slots on the receive side to the connection. Alternatively, the controller may attempt to allocate dedicated slots on one side of the network element and some dedicated and some dilation slots on the other side of the network element.

If the network element is not able to find sufficient dedicated slots on either the transmit or receive side to handle all of the requirements for that connection, it then looks to see if it can find some dedicated slots on both the receive and transmit sides of the network element for the connection.

If this is not possible, the controller will look to see if there are any dedicated slots on the transmit or receive side and attempt to use those slots in connection with dilation slots to accommodate the new connection. If there are no dedicated slots that may be used for this connection, the controller attempts to allocate dilation slots for this connection. If there are no possible combinations of dedicated and dilation slots, the connection cannot be made through the network element.

According to one embodiment of the invention, the following sequence may be used to allocate slots to connections:

(1) From dedicated slots of RX to dedicated slots of TX; if this succeeds, stop; otherwise try 2a.
(2a) From dilation slots in RX to dedicated slots of TX; if this succeeds, stop. Otherwise try 2b.
(2b) From some dedicated slots and spare slots in RX to dedicated slots of TX; if this succeeds, stop. Otherwise, try 3a.
(3a) From dedicated slots of RX to some dedicated and some dilation slots of TX; if this succeeds, stop. Otherwise, try 3b.
(3b) From dedicated slots of RX to dilation slots of TX; if this succeeds, stop. Otherwise, try 4.
(4) From dilation slots of RX to dilation slots of TX; if this succeeds, stop. Otherwise, the connection cannot be configured through the network element.

In this sequence, items 2b and 3a are optional and may be used to improve the performance of the network element but are not required to implement the invention. Additional and/or alternative sequences may be used as well and the invention is not limited to this particular embodiment.

If the connection can be made, the controller will add the slot allocation to the map(s) for the network element. The maps tell the processors on the port cards when to transmit/receive the connection and to which switch element the connection should be sent/received from. The maps also tell the switch elements on the switch cards where to switch the connection on the switch card. In one embodiment, the maps contain slot allocations for working, pass through, span protect, ring protect, and extra traffic for the connections so that upon occurrence of a failure upstream or downstream, the failure may be accommodated by the network element simply by causing the processing units and switching elements to read the appropriate entry from the map according to the state of the ring. Additionally, since the several states of the ring all obtain slot allocations which are included in the map, switching from working to protection (either span or ring) may be done very quickly since the connection route through the network element has been predefined and established in advance. Also, since slots have been pre-allocated and the maps for each protection mode has been prepared, the network switch is assured to have bandwidth available throughout the switch to handle the change from working to protection by allowing the corresponding protection map use the shared protection slots. Accordingly, the switch is non-blocking in operation.

Once the network element is operational, connections may be added and deleted through the switch by causing the controller to allocate slots to the new connection or by causing the controller to de-allocate slots for a connection that has been deleted. The manner of allocating slots to a new connection follows the pattern discussed above.

As discussed briefly above, the invention may be used in network topologies other than in SONET ring networks. For example, in a mesh network topology it is possible to form virtual rings, commonly referred to as p-cycles, in which a portion of the bandwidth on the p-cycle is reserved to carry protection traffic on the p-cycle. The controller and network element described above may be used to allocate working and protection paths on a mesh network as well and the invention is thus not limited to an implementation in which the controller and network element are used in a BLSR based network OR even using a SONET/SDH transmission protocol.

FIGS. 5 through 8 illustrate several embodiments in which maps are associated with the processor units on the port cards and the switch elements on the switch cards to enable non-blocking switching to take place. It will be assumed in the following description that the maps in the embodiments of FIGS. 5-8 were created as discussed above, although other manners of creating the maps may be used as well.

Figure 5:
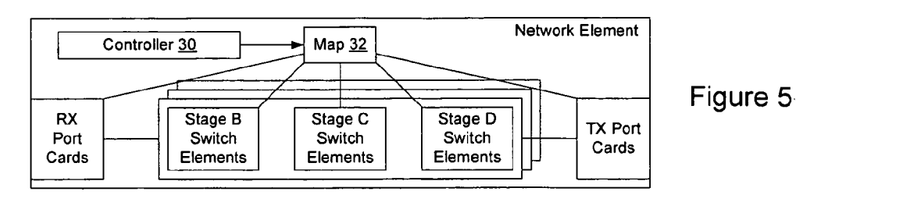
FIGS. 5-8 are functional block diagrams illustrating network elements according to embodiments of the invention.

As shown in FIG. 5, the network element 10 according to one embodiment of the invention includes a controller 30 configured to create one or more maps/map entries 32 for use by the components of the network element 10 to define transmission characteristics of connections provisioned through the network element.

Figure 6:
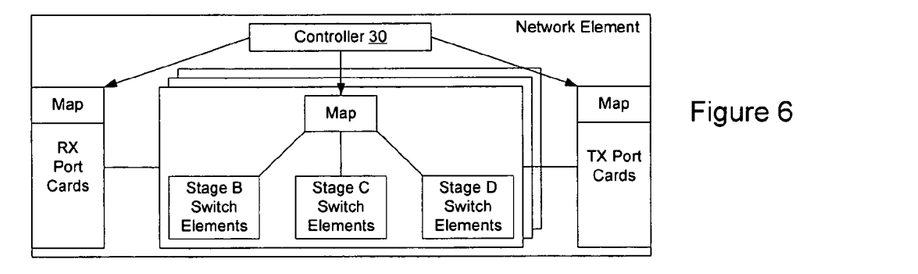
Figure 7:
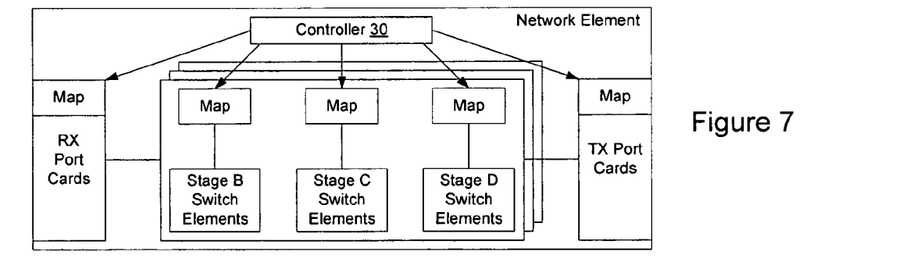
Figure 8:
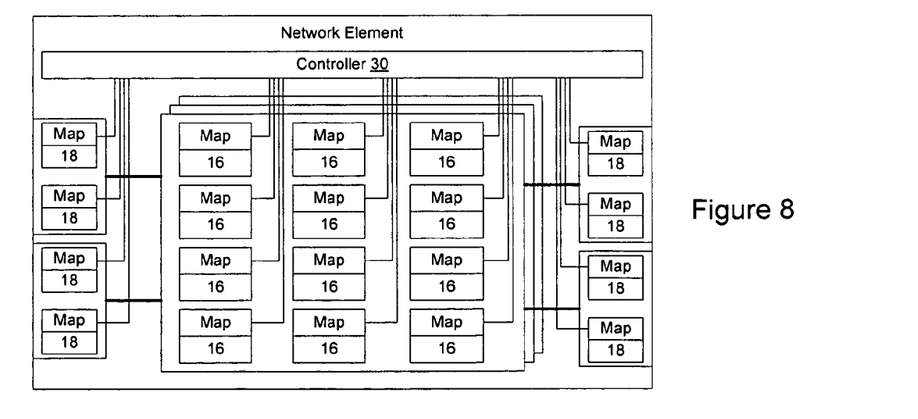

There are many ways of creating the maps for use by the various components and the invention is not limited to any particular implementation. For example, in FIG. 5 the controller has defined one map for use by all components of the network element. In FIG. 6, the controller has defined one map for each port card and one map for each of the switch cards. In FIG. 7 the controller has defined maps for each of the port cards and each of the stages on each of the switch cards. In FIG. 8 the controller has defined a map for each of the port processors on each of the port cards and a map for each of the switch elements on each of the switch cards. These are only several examples and the invention is not limited to any particular manner of associating the maps with the components within the network elements. Multiple other possible combinations exist and the invention is thus not limited to these several illustrated example embodiments. The "maps" referred to herein may be logical maps or may be entries in another map table.

The maps/map entries at the different stages of the switch will depend on the architecture of the switch. For example, in the switch illustrated in FIG. 3 and discussed in greater detail herein, ingress switching is performed at stage B to enable span and ring switching to be handled by the ingress switching element while span and ring bridging is are handled by the stage D switch elements. By separating these several switching functions, the states of multiple protection groups are 'decoupled' thus avoiding a combinatorial explosion of possible states and therefore reducing the number of maps/map entries on the various network elements. Additionally, in the embodiment discussed above in connection with FIG. 3, pass through and extra traffic is switched at stage C and handled on a separate path through the network switch. This too minimizes the number of maps/map entries that must be stored and made available on the network switch.

Once working-to-working connectivity has been established, each protection port card will have to store two connection sub-maps/map entries for each ring on that card, and switch between those sub-maps depending on the state of the corresponding ring. Note that there is no cross-coupling between ring states. To further simplify the number of maps used in stage A, one implementation is to route a given STS-1 of a ring and its 2 associated STS-1's (e.g. We with Ww, Pe and Pw) to one particular switch card. The port switching element in stage A can be provided with one map/map entry for each ring for Ww and We. Specifically, the map/map entry contains information mapping traffic on the Ww and We to slots for that traffic. Additionally, the port processor in stage A is provided with two additional maps/map entries—one for working/ring/span protect and another for extra traffic and pass through traffic.

At stage B, the switching elements are provided with four sets of maps/map entries per ring. Specifically, the stage B switching elements include one map/map entry to be used when the status of the ring is set to working, one for when the status is span protect, one for when the status of the ring is set to ring protect, and one for when the status of the ring is set to extra/pass through.

Stage C has two independent paths—one path for working traffic and one for pass through and extra traffic. Stage C in this embodiment cross-connects the traffic of each path independently. The paths are independent and separated. One map/map entry per ring shows each STS-1 in the ring and defines the input/output relationship in the stage C switch element. The pass through mode is a special case of ring-to-ring connectivity in which an incoming STS goes to the outgoing STS of the same ring—i.e. continuing around the ring.

At stage D, there are four maps/map entries. One for working, one for span bridge, one for ring bridge, and one for extra/pass through traffic. Since extra/pass through traffic and working traffic are able to be handled simultaneously, the maps/map entries for these states are used concurrently.

Stage E includes three maps/map entries—one for span switching, one for ring switching, and one for extra/pass through. Additionally, stage E has one map/map entry per ring called working that contains the Ww working sub-map and the We working submap. The following table illustrates the maps/map entries for the various stages of the five stage switch illustrated in FIG. 3:

| Stage | Maps/map entries |
|---|---|
| A | 1. Working/ring/span |
|   | 2. Extra/passthrough |
| B | 1. Working (Ww to working path; We to working path) |
|   | 2. Span (Pw to working path for Ww; Pe to working path for We) |
|   | 3. Ring (Pe to working path for Ww; Pw to forking path for We) |
|   | 4. Extra/Passthrough (from Pw to extra/passthrough path; from Pe to extra/passthrough path) |
| C | 1. stage B-stage D connectivity for all traffic |
| D | 1. Working (working path to Ww; working path to We) |
|   | 2. Span (working path to Pw for Ww; working path to Pe for We) |
|   | 3. Ring (working path to Pe for Ww; working path to Pw for Ww) |
|   | 4. Extra/passthrough (extra/passthrough to Pw; extra/passthrough to Pe) |
| E | 1. Working (Ww working map; We working map) Span switching uses the same map as working (We working map or Ww working map) Ring switching uses the same map as working (same map as We working map or Ww working map) Extra/passthrough map |

The controller may be embodied as a software program implemented in control logic on a processor on the network element 10 or may be configured as a FPGA or other processing unit on the network element. According to one embodiment, the controller is defined in control logic on the network element. The control logic in this embodiment may be implemented as a set of program instructions that are stored in a computer readable memory within the network element and executed on a microprocessor on the network element. However, in this embodiment as with the previous embodiments, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

For example, under the current state of the standards that govern transmissions on SONET networks, in-ring time-slot interchange is not permitted under normal conditions for working 'pass-through' traffic or for protection 'pass-through' traffic when in protection states. The add/drop node may add/drop traffic from/to a different slot on a ring 'client' port—sometimes referred to as tributaries. The invention however is not limited to an embodiment that does not allow time slot interchange. Current proposals for allowing time slot interchange on SONET rings are being proposed and the invention can potentially be applied to such extensions.

It should be understood that various changes and modifications of the embodiments shown in the drawings and described herein may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A network element for routing plural connections through a network, comprising:
   first and second sets of network interfaces for receiving and transmitting channels of network traffic;
   a set of predefined maps defining desired interconnections of selected channels at the first set of interfaces to selected channels at the second set of interfaces, the set of predefined maps defining sets of working interconnections for use when the network is in a working state and plural protection interconnections for use when the network is in respective fault states, wherein a selected subset of the set of predefined maps configures the network element for each protection mode of a plurality of protection modes; and
   plural switching elements connected between the first and second sets of network interfaces, the switching elements being configurable according to the predefined maps to interconnect selected channels at the first set of network interface to selected channels at the second set of network interfaces, the plural switching elements including at least one spare switching element to enable shared protection of the plural switching elements.

2. The network element of claim 1, wherein the channels are multiplexed in groups for network transmission and demultiplexed at the first and second set of interfaces for routing through the switching elements to enable connection of any channel at the first set of interfaces to any channel at the second set of interfaces.

3. The network element of claim 2, wherein each of the channel groups comprises plural subgroups, each subgroup being routed through a respective switching element of the plural switching elements.

4. The network element of claim 3, wherein each switching element has a number of dedicated channels numerically equal to the number of channels in the subgroups routed through that switching element and a number of dilation channels.

5. The network element of claim 1, wherein the plural switching elements are organized into plural series-connected switching stages, each of the plural series-connected switching stages comprising plural switching elements.

6. The network element of claim 5, where the plural series-connected switching stages comprise:
   a first switching stage comprising plural switching elements each having a configuration determined by a first set of the predefined maps, the first set of predefined maps comprising:
      a first subset of predefined maps for the first switching stage defining desired interconnections of channels through the first switching stage when the network is in a working state;
      a second subset of predefined maps for the first switching stage defining desired interconnections of channels through the first switching stage when the network is in a fault state requiring span switching at the network element; and
      a third subset of predefined maps for the first switching stage defining desired interconnections of channels through the first switching stage when the network is in a fault state requiring ring switching at the network element; and
   a second switching stage comprising plural switching elements each having a configuration determined by a second set of the predefined maps, the second set of predefined maps comprising:
      a first subset of predefined maps for the second switching stage defining desired interconnections of channels through the second switching stage when the network is in a working state; and
      a second subset of predefined maps for the second switching stage defining desired interconnections of channels through the second switching stage when the network is in a fault state requiring passthru at the network element; and
   a third switching stage comprising plural switching elements each having a configuration determined by a third set of the predefined maps, the third set of predefined maps comprising:
      a first subset of predefined maps for the third switching stage defining desired interconnections of channels through the third switching stage when the network is in a working state;
      a second subset of predefined maps for the third switching stage defining desired interconnections of channels through the third switching stage when the network is in a fault state requiring span bridging at the network element; and
      a third subset of predefined maps for the third switching stage defining desired interconnections of channels through the third switching stage when the network is in a fault state requiring ring bridging at the network element.

7. The network element of claim 6, wherein:
   the first subset of predefined maps for the first switching stage defines connections for a working path and connections for an extra traffic/passthru path via a protection path; and
   the first subset of predefined maps for the third switching stage defines connections for a working path and connections for an extra traffic/passthru path via a protection path.

8. The network element of claim 6, wherein the first, second and third switching stages define a 3 stage CLOS switching architecture.

9. The network element of claim 8, wherein:
   the first set of network interfaces has a configuration determined by a fourth set of the predefined maps, the fourth set of predefined maps comprising:
      a first subset of predefined maps for the first set of network interfaces defining desired interconnections of channels through, the first set of network interfaces when the network is in any of a working state, a fault state requiring span switching at the network element and a fault state requiring ring switching at the network element; and a second subset of predefined maps for the first set of network interfaces defining desired interconnections of channels through the first set of network interfaces when the network is in a fault state requiring passthru at the network element; and the second set of network interfaces has a configuration determined by a fifth set of the predefined maps, the fifth set of predefined maps comprising:

a first subset of predefined maps for the second set of network interfaces defining desired interconnections of channels through the second set of network interfaces when the network is in any of a working state, a fault state requiring span bridging at the network element and a fault state requiring ring bridging at the network element; and a second subset of predefined maps for the second set of network interfaces defining desired interconnections of channels through the second set of network interfaces when the network is in a fault state requiring passthru at the network element.

10. The network element of claim 5, wherein:

each of the plural series-connected switching stages comprises a plurality of groups of switching elements;

the channels are multiplexed in groups for network transmission and demultiplexed at the first and second set of interfaces for routing through the switching elements to enable connection of any channel at the first set of interfaces to any channel at the second set of interfaces; and each of the channel groups comprises plural subgroups, each subgroup being routed through a respective group of switching elements at each the series-connected switching stage.

* * * * *